Figure 1:
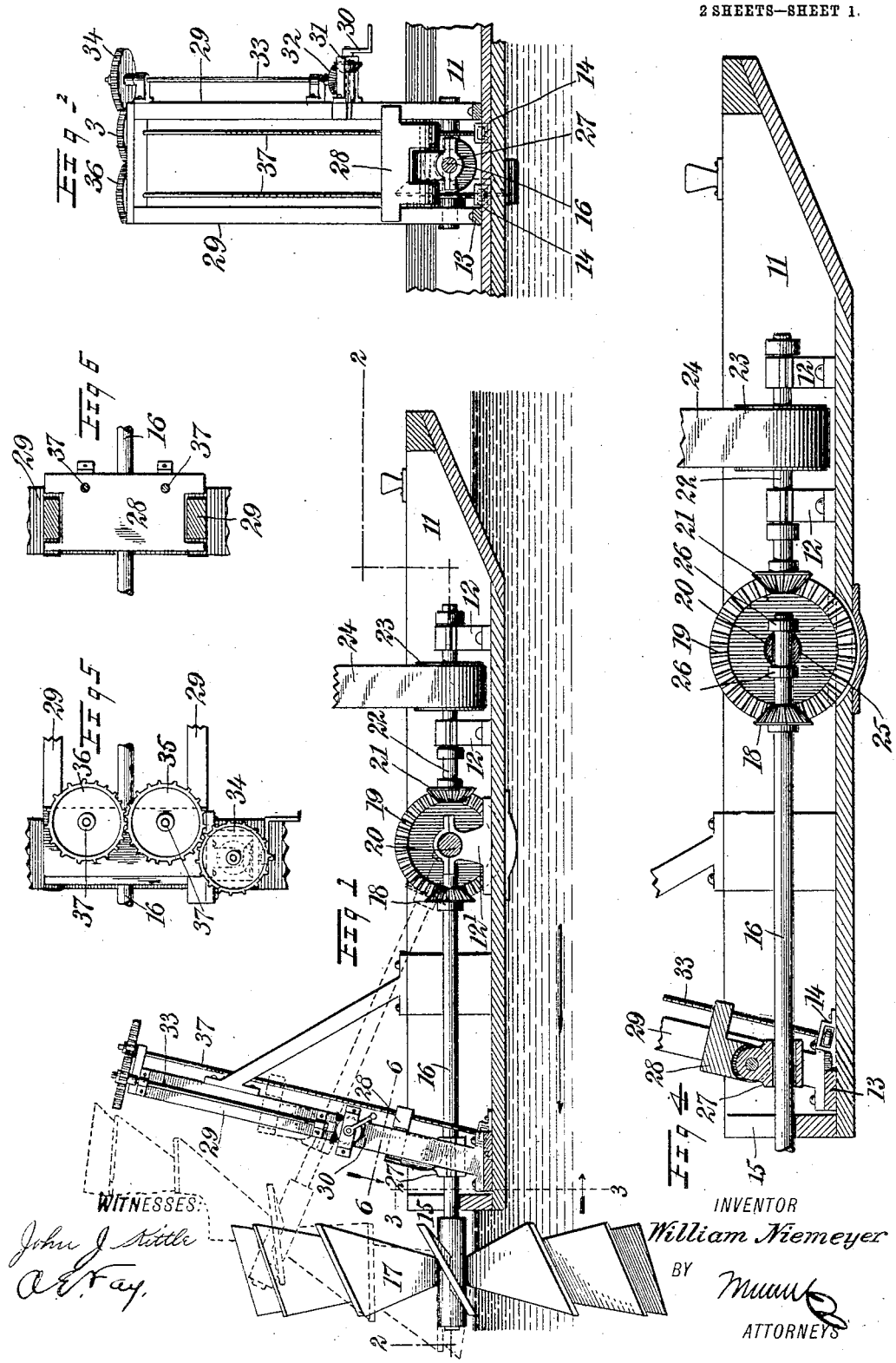

No. 778,702. PATENTED DEC. 27, 1904.
W. NIEMEYER.
CURRENT MOTOR.
APPLICATION FILED MAY 14, 1904.
2 SHEETS—SHEET 2.
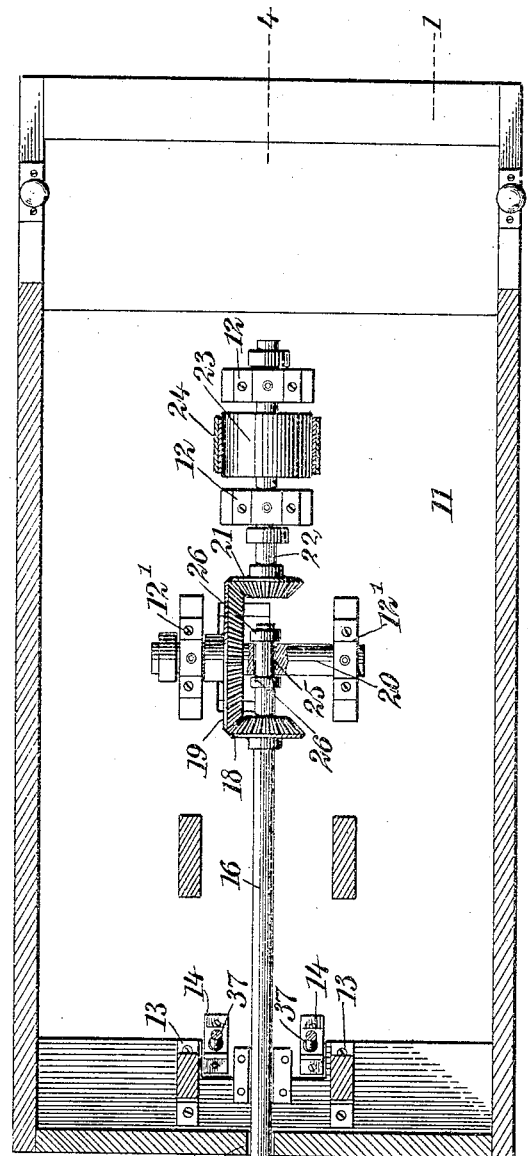
FIG. 2.
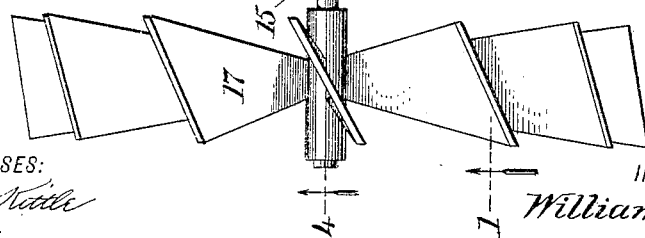
WITNESSES:
INVENTOR
William Niemeyer
BY
ATTORNEYS No. 778,702.

Patented December 27, 1904.

UNITED STATES PATENT OFFICE.

WILLIAM NIEMEYER, OF ST. JOSEPH, MISSOURI.

CURRENT-MOTOR.

SPECIFICATION forming part of Letters Patent No. 778,702, dated December 27, 1904.

Application filed May 14, 1904. Serial No. 207,933.

*To all whom it may concern:*

Be it known that I, WILLIAM NIEMEYER, a citizen of the United States, and a resident of St. Joseph, in the county of Buchanan and State of Missouri, have invented a new and Improved Current-Motor, of which the following is a full, clear, and exact description.

My invention relates to a motor for use upon rivers and other places where there is a current of water.

The objects of the invention are to provide a device of the character described which can be set up without the construction of costly masonry works and in which the operating device may be moved from the water without disconnecting any of the parts or lifting any of the heavy parts of the device out of the water.

Further objects of the invention will appear in the course of the subjoined description.

Reference is to be had to the accompanying drawings, forming a part of this specification, in which similar characters of reference indicate corresponding parts in all the figures.

Figure 1 is a vertical longitudinal sectional view of a preferred form of my invention on the line 1 1 of Fig. 2. Fig. 2 is a sectional view of the same on the line 2 2 of Fig. 1. Fig. 3 is a sectional view on the line 3 3 of Fig. 1. Fig. 4 is a sectional view on the line 4 4 of Fig. 2. Fig. 5 is a fragmentary plan view, and Fig. 6 is a sectional view on the line 6 6 of Fig. 1.

In the drawings, 11 represents a barge or other floating object provided with bearings 12 and 12' for the purpose of supporting shafts, as will appear. In the bottom of the barge are located cleats or standards 13 and 14, the uses of which will be described below. At the stern of the barge is a slot 15 for the passage of a shaft 16, which is the main shaft of the machine and which carries upon its outer end a water-wheel 17, which may be of any known or desired construction. The shaft carries upon its inner end a gear or pinion 18, which for convenience is shown as a bevel-gear, which meshes with a larger bevel-gear 19, loosely mounted upon a shaft 20, supported in the bearings 12'. The gear 19 in turn meshes with another gear 21, mounted on a shaft 22, which is supported in the bearings 12 and carries a pulley 23 for transmitting power to a belt 24. From this construction it will be seen that when the barge 11 is anchored in the river and the current takes the direction indicated by the long arrow in Fig. 1 the wheel 17 will be rotated and through the shafts and gearing mentioned will cause rotation of the pulley 23 and movement of the belt 24. It will be obvious that any other means could be employed for transmitting power from this device and that the one shown is merely illustrative of one embodiment of the invention.

Through the center of the shaft 20 is a passage 25, through which passes the end of the shaft 16. This shaft is provided with collars 26 or equivalent devices for preventing it from moving longitudinally with respect to the shaft 20, but at the same time permitting it to rotate without disturbing the shaft 20. The opposite end of the shaft 16 is mounted in a movable bearing 27, which is pivoted to a block 28, adapted to reciprocate on ways 29, which in the present instance are inclined slightly from the vertical. The means for reciprocating this block 28 and bearing 27 comprises a crank 30, gears 31 32, shaft 33, additional intermeshing gears 34, 35, and 36, and the right and left handed screw-threaded rods 37. The screw-threaded rods 37 pass through screw-threaded openings in the block 28, as indicated in Figs. 3 and 6, and it will be obvious that rotation of the crank 30 will cause the reciprocation of the bearing 27. As the shaft 16 is mounted in the bearing, but free to slide longitudinally with respect thereto, it will be obvious that such operation of the bearing will cause the shaft to swing upon its pivot—namely, the shaft 20—as indicated in dotted lines in Fig. 1. This is a very important part of my invention. In the devices heretofore constructed for this purpose it has been necessary to lift the whole barge out of the water in order to remove the wheel from the influence of the current, and in that class in which the wheel was mounted upon masonry it was necessary to construct a very costly foundation for the device. Neither one of these objections can be urged against my invention.

Although I have illustrated a certain definite construction which is one practical way of carrying out my invention, it will be obvious that it may be embodied in many other forms without departing from the spirit of the invention as represented in the appended claims. The means for operating the rods 37, for instance, could obviously be changed and modified in many ways and, in fact, could be replaced by any other means which would accomplish the desired result.

Having thus described my invention, I claim as new and desire to secure by Letters Patent—

1. A current-motor comprising a water-wheel, a pivoted shaft with which said wheel is mounted, a gear on said shaft, a shaft arranged at right angles to said first-named shaft, a gear on said second shaft meshing with said first-named gear, a third shaft, a gear thereon meshing with said second gear, and power-transmission means connected with said last-named shaft.

2. A current-motor comprising a water-wheel, a pivoted shaft on which said wheel is mounted, a second shaft at right angles to said first-named shaft, said second shaft having a passage therethrough for said first-named shaft and constituting a pivot therefor, and means for transmitting power from said first-mentioned shaft.

3. A current-motor comprising a water-wheel, a pivoted shaft on which said wheel is mounted, a second shaft at right angles to said first-named shaft, a third shaft, a gear on each of said shafts, said gears meshing with each other so as to transmit power from said first-mentioned shaft to said third-mentioned shaft, a passage through said second-mentioned shaft for said first-mentioned shaft, and a reciprocating bearing for said first-mentioned shaft.

4. A current-motor comprising a water-wheel, a pivoted shaft on which said wheel is mounted, a second shaft having a passage therethrough for said first-mentioned shaft and constituting a pivot therefor, means for transmitting power from said first-mentioned shaft, and a reciprocating bearing for said first-mentioned shaft whereby the latter may be caused to swing about the second-mentioned shaft.

5. A current-motor comprising in combination, a water-wheel, a shaft on which said wheel is mounted, a gear-wheel carried by said shaft, a second gear-wheel with which said first gear-wheel meshes, a third gear-wheel with which said second gear-wheel meshes, a shaft carrying the same, means for transmitting rotation from said last shaft, a rotatable bearing for said first shaft at substantially the axis of said second gear-wheel, and means for raising and lowering said first shaft about the axis of said bearing.

6. A current-motor comprising in combination, a water-wheel, a shaft rotating therewith and supporting the same, a gear-wheel carried by said shaft, a second gear-wheel meshing therewith, a bearing for said shaft having an axis of rotation substantially coincident with the axis of rotation of said second gear-wheel, a third gear-wheel meshing with said second gear-wheel, a shaft carrying the same, a belt-pulley on said shaft, and means for raising and lowering the extremity of said first shaft remote from the said bearing.

7. In combination, a floating barge having a recess in the gunwale thereof opening upwardly, a shaft normally occupying said recess, a wheel carried by said shaft, means for raising said shaft and wheel, and means for transmitting power from said shaft.

8. The combination of a floating barge having a recess opening upwardly in the stern thereof, a shaft normally lying in said opening, a water-wheel on said shaft, means for transmitting power from said shaft mounted on said barge, and means for raising said shaft bodily upon a pivot.

In testimony whereof I have signed my name to this specification in the presence of two subscribing witnesses.

WILLIAM NIEMEYER.

Witnesses:
   Dan Marsee,
   Henry Voth.